United States Patent [19]

Ando et al.

[11] 4,450,452

[45] May 22, 1984

[54] DATA RECORDING MEDIUM

[75] Inventors: Hideo Ando, Tokyo; Toshiharu Nakagawa, Yokohama; Yoshinori Fujimori, Kawasaki, all of Japan

[73] Assignee: Tokyo Shibaura Denki Kabushiki Kaisha, Kawasaki, Japan

[21] Appl. No.: 344,713

[22] Filed: Feb. 1, 1982

[30] Foreign Application Priority Data

Feb. 5, 1981 [JP] Japan ................................ 56-14981

[51] Int. Cl.³ ............................................ G01D 15/34
[52] U.S. Cl. ................................................ 346/135.1
[58] Field of Search ........................ 346/135.1, 76 L; 358/297

[56] References Cited

U.S. PATENT DOCUMENTS

| | | | |
|---|---|---|---|
| 3,665,483 | 5/1972 | Becker et al. | 346/135.1 X |
| 4,090,031 | 5/1978 | Russell | 358/130 |
| 4,179,532 | 12/1979 | Soeding | 346/135.1 X |
| 4,188,433 | 2/1980 | Dijkstra et al. | 346/135.1 X |
| 4,282,534 | 8/1981 | Shinozaki et al. | 346/135.1 |
| 4,313,190 | 1/1982 | Slaten | 346/135.1 X |
| 4,363,844 | 12/1982 | Lewis et al. | 346/76 L X |

FOREIGN PATENT DOCUMENTS

| | | |
|---|---|---|
| 2026805 | 12/1970 | Fed. Rep. of Germany . |
| 2653831 | 6/1978 | Fed. Rep. of Germany . |
| 3023134 | 1/1981 | Fed. Rep. of Germany . |
| 52-124309 | 10/1977 | Japan . |

Primary Examiner—Donald A. Griffin
Attorney, Agent, or Firm—Cushman, Darby & Cushman

[57] ABSTRACT

The invention provides a data recording medium comprising: a pair of disc-shaped substrates opposing each other at a distance; a radiation-sensitive recording layer formed on an opposing surface of each of the substrates; a protective layer formed on each of the recording layers; and an adhesive layer which fills a space defined between the protective layers and which is bonded to the protective layers. The data recording medium of the invention has great mechanical strength, is capable of preventing degradation of the recording layer, is easy to manufacture and is durable over a long period of time.

9 Claims, 6 Drawing Figures

DATA RECORDING MEDIUM

BACKGROUND OF THE INVENTION

The present invention relates to a data recording medium. The data recording medium has a radiation-sensitive recording layer. A laser beam is focused on the radiation-sensitive recording layer to form a pit therein, thereby recording optical data. The optical data recorded in this manner can be read out.

FIG. 1 is a sectional view showing an example of a conventional data recording medium. A data recording medium 1 of this example has two disc-shaped transparent substrates 3 of synthetic resin, on each of which is formed a recording layer 2 of a light-reflecting material. These transparent substrates 3 are opposed to each other such that the recording layers 2 face each other. The transparent substrates 3 are bonded to each other through inner and outer spacers 5a and 5b and an adhesive so as to define a hollow space 4 therebetween.

However, the data recording medium of this type has drawbacks to be described below. For example, since the writing and reading of data in and out of the recording layers 2 is performed through the intermediacy of the transparent substrates 3, the transparent substrates 3 cannot be made very thick. At the same time, these two transparent substrates 3 are bonded to each other through the inner and outer spacers 5a and 5b only at the inner and outer peripheries thereof. Therefore, each transparent substrate is weak in mechanical strength and is thus subject to bending by external forces. In addition to this, the transparent substrate 3 has a relatively small elasticity. When the data recording medium is left to stand obliquely for a long period of time, the medium becomes distorted due to its own weight. Such a distortion persists after the data recording medium is removed from this condition. When the part of the data recording medium separated from the inner and outer spacers 5a and 5b (nonbonded part) is clamped and pressed by the fingers from both sides, the hollow space 4 is eliminated. The opposing recording layers 2 then contact each other and are subject to damage. Furthermore, the nonbonded part of the data recording medium is also subject to undulations and deflections. When the data recording medium is stored horizontally, the upper transparent substrate may become indented due to its own weight. Since the inner and outer spacers 5a and 5b are incorporated, the manufacturing cost is increased. When the inner and outer spacers 5a and 5b are bonded to the transparent substrates 3, care must be taken not to allow overflow of the adhesive into the hollow space 4. This results in a laborious bonding step. As may be easily understood, since the transparent substrates 3 are bonded only at the contact parts corresponding to the narrow inner and outer spacers 5a and 5b, the contact areas are small and the adhesion strength between the transparent substrate 3 is weak. If a gas is filled in the hollow space 4, a pressure difference is established between the outer atmosphere and the hollow space 4 between the transparent substrates 3 when the pressure or temperature in the outer atmosphere changes. This may result in deformation of the transparent substrates. When a plastic material is used for the transparent substrates 3, the transparent substrates 3 tend to allow water to permeate easily, and water may permeate from the outer atmosphere to the hollow space 4 and vice versa. Before the water content which has permeated through the transparent substrate 3 reaches the hollow space 4, it also permeates through the recording layer 2 and degrades the recording layer 2. When the data recording medium is left to stand in an atmosphere at high temperature, the humidity in the hollow space 4 is increased. If the data recording medium is rapidly cooled from the outside under this state, condensate may deposit on the surface of the recording layers 2. The plastic material of the transparent substrates 3 also allows air to permeate easily. Therefore, the hollow space 4 cannot be evacuated or filled with an inert gas in order to achieve a long service life of the recording layers 2, hence, the service life of the data recording medium cannot be prolonged.

A data recording medium as shown in FIG. 2 or 3 is proposed in order to solve these problems. FIG. 2 is a sectional view of an example of a data recording medium. In the data recording medium of this example, a recording layer 11 of Te is formed by vacuum deposition on one surface each of a pair of transparent substrates 10 of an acrylic resin, for example. These recording layers 11 are opposed to each other and then the transparent substrates 10 are bonded through an adhesive layer 12 of an epoxy-type adhesive. FIG. 3 is a sectional view showing another example of a data recording medium. In the data recording medium of this example, after an indented layer 13 with tracking guides etc. is formed on the surface of the transparent substrate 10, the recording layer 11 is formed thereover. The transparent substrates 10 thus obtained are bonded to each other through the adhesive layer 12 of the epoxy-type adhesion so that the recording layers 11 face each other.

However, in the data recording medium of this type, the transparent substrates 10 are bonded to each other by directly applying the adhesive to the recording layers 11. Therefore, during the step of uniformly applying the adhesive, part of the recording layer 11 may peel off, thus adversely affecting the recording layers and providing obstructions to mass production of the data recording media.

As may be seen from FIGS. 2 and 3, since the recording layers 11 and the adhesive layer 12 are in direct contact with each other, the recording layers 11 may be adversely affected by certain components of the adhesive layer 10.

SUMMARY OF THE INVENTION

It is an object of the present invention to provide a data recording medium which is great in mechanical strength, which is capable of preventing degradation of the recording layers, which is easy to manufacture, and which is durable over a long period of time.

In order to achieve this object, there is provided according to the present invention a data recording medium comprising:
  a pair of disc-shaped substrates opposing each other at a distance;
  a radiation-sensitive recording layer formed on an opposing surface of each of said substrates;
  a protective layer formed on each of said recording layers; and
  an adhesive layer which fills a space defined between said protective layers and which is bonded to said protective layers.

DETAILED DESCRIPTION OF THE PREFERRED EMBODIMENTS

Figure 1:
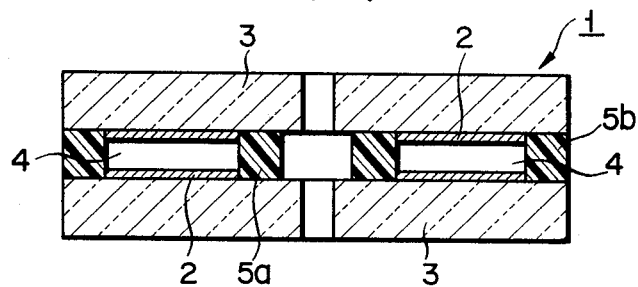
FIG. 1 is a vertical sectional view showing an example of a conventional data recording medium.
Figure 2:
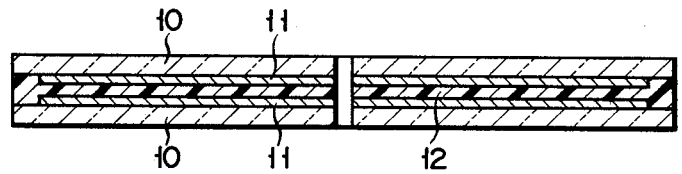
FIG. 2 is a sectional view of the main part of another example of a conventional data recording medium.
Figure 3:
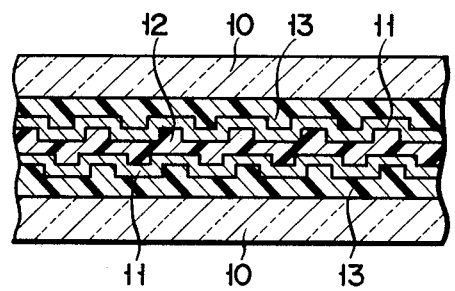
FIG. 3 is a sectional view of still another example of a conventional data recording medium.
Figure 4:
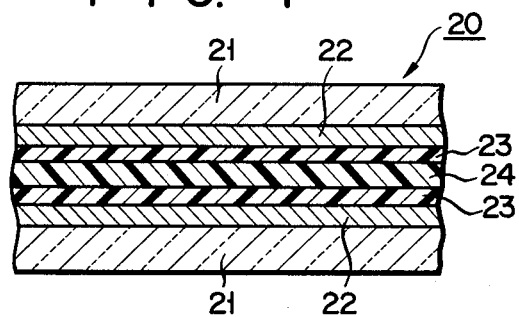
FIG. 4 is a sectional view showing a data recording medium according to an embodiment of the present invention.

FIG. 4 is a sectional view of the main part of a data recording medium according to an embodiment of the present invention. In FIG. 4, reference numeral 20 denotes a data recording medium. The data recording medium 20 has a pair of substrates 21, a recording layer 22 formed on the opposing surface of each of the substrates 21, a protective layer 23 formed on each of the recording layers 22, and an adhesive layer 24 of an adhesive formed to fill the space between the protective layers 23.

The substrate 21 is made of glass or a synthetic resin and is of a disc-shape having a thickness of 0.2 to 2 mm and a diameter of 30 cm. Examples of the synthetic resin for the substrate 21 may include, a vinyl chloride-acetate copolymer, an ethylene-vinyl acetate copolymer, polycarbonate, polyacrylic acid, polymethacrylic acid, and a lower alkyl ester of polyacrylic acid or polymethacrylic acid. In order to obtain the substrate 21 of greater mechanical strengh, it is preferably to use polyacrylic acid, polymethacrylic acid or a lower alkyl ester thereof.

The recording layer 22 is of an annular shape with the central hole of the substrate 21 as the center. The recording layer 22 is made of a light-reflecting material. The light-reflecting material is required to reflect the laser beam and may be for example Te or Al. The thickness of the recording layer 22 is less than 5,000 Å, preferably 200 to 600 Å. The method for forming the recording layer 22 on the surface of the substrate 21 may be selected freely only if the recording layer 22 of small thickness can be uniformly formed. The method, therefore, may be a deposition method such as vacuum deposition, sputtering or ion deposition. If the recording layer is made of Te, the surface of the recording layer can be oxidized to form an oxide layer of a predetermined thickness, for example 20 to 500 Å. This oxide layer serves to protect the surface of the recording layer.

The protective layer 23 may be made of an organic material such as an epoxy resin, polystyrene resin, silicone resin, polycarbonate resin, vinyl chloride-acetate copolymer, and ethylene-vinyl acetate copolymer.

The protective layer 23 may alternatively be made of an inorganic material such as $SiO_2$, $SiO$, $In_2O_3$, $SnO_2$, $MgO$, $ZnO$, $ZnO_2$, $Al_2O_3$, $CeO_2$, $TiO_2$, $MgF_2$, $CaF_2$ and $CeF_3$.

Figure 5:
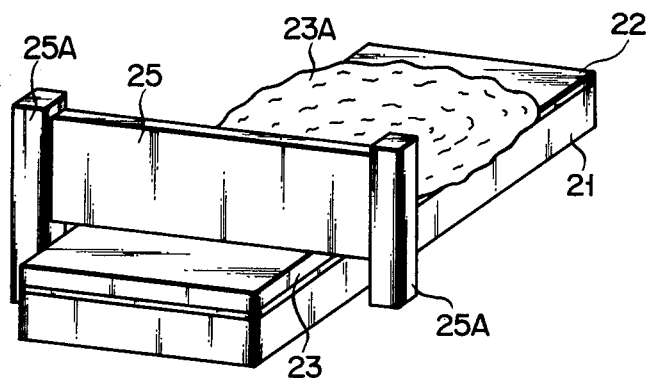
FIG. 5 is a perspective view showing a method for forming a protective layer according to an embodiment of the present invention.

If the protective layer 23 is made of an organic material as described above, it is formed to a thickness of 100 $\mu$m, by coating. If the protective layer 23 is made of an inorganic material, it is formed to a thickness of 200 to 5,000 Å, by vacuum deposition, sputtering, or the like. For example, when the protective layer is made of an organic material, the spinner coating method may be adopted. According to this method, the softened organic material is applied on the recording layer 22 formed on the substrate 21, and the substrate 21 is rotated by a suitable means to spread the organic material by centrifugal force. More specifically, a styrene monomer dissolved in a solvent is applied on the surface of the recording layer 22 by spinner coating to obtain polystyrene. This allows relatively easy formation of the protective layer 23, and facilitates mass production. The gate method as shown in FIG. 5 may alternatively be adopted. According to this method, a predetermined amount of a resin 23A for the protective layer which is softened is applied on the recording layer 22 formed on the substrate 21 and is passed through a gate 25 supported on support columns 25A. Then, the resin 23A is spread to a uniform thickness and forms the protective layer 23. An epoxy-type or rubber-type adhesive is applied to a thickness of 50 to 300 $\mu$m to form the adhesive layer 24.

Figure 6:
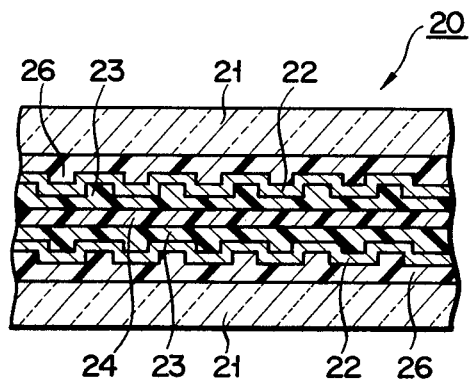
FIG. 6 is a sectional view of the main part of a data recording medium according to another embodiment of the present invention.

FIG. 6 is a sectional view of the main part of another embodiment of the data recording medium of the present invention. According to this embodiment, after an indented layer 26 comprising acrylic resin with tracking guides etc. is formed on the surface of the substrate 21, a recording layer 22 is formed thereover. A protective layer 23 is further formed thereover. Two substrates 21 thus obtained are opposed to each other with the protective layers 23 facing each other, and are bonded through an adhesive layer 24 of an epoxy-type adhesive. The materials, thicknesses and the methods for formation of the substrates 21, the recording layers 22, the protective layers 23 and the adhesive layer 24 are the same as those of the embodiment described above. Therefore, the detailed description thereof will be omitted.

The adhesion strength after bonding may be increased by using an epoxy resin for the protective layer.

According to the present invention, since the protective layer is formed between the adhesive layer and each recording layer, the adhesive layer may not be brought into direct contact with the recording layer. Therefore, the recording layer may not be damaged nor degraded. The data recording medium is easy and inexpensive to manufacture. The data recording medium of the present invention is furthermore great in mechanical strength and does not deform over a long period of time.

What we claim is:

1. A medium capable of recording and reproducing data comprising:
   a pair of disc-shaped substrates opposing each other at a distance;
   a radiation-sensitive recording layer having a thickness of less than 5,000 Å formed on an opposing surface of each of said substrates, optical data having not yet been recorded in said recording layer;
   a protective layer formed on each of said recording layers; and
   an adhesive layer which fills a space defined between said protective layers and which is bonded to said protective layers, and wherein
   an indented layer with tracking guides is formed between said substrate and said recording layer and a surface of said protective layer to be bonded to said adhesive layer is formed flat.

2. A medium according to claim 1, wherein said protective layer is made of an organic material selected from the group consisting of an epoxy resin, polystyrene resin, silicone resin, polycarbonate resin, vinyl chloride-acetate copolymer, and ethylenevinyl acetate copolymer.

3. A medium according to claim 2, wherein said protective layer has a thickness of 1 to 100 $\mu$m.

4. A medium according to claim 1, wherein said protective layer is made of an inorganic material selected from the group consisting of $SiO_2$, $SiO$, $In_2O_3$, $SnO_2$, $MgO$, $ZnO$, $ZnO_2$, $Al_2O_3$, $CeO_2$, $TiO_2$, $MgF_2$, $CaF_2$ and $CeF_3$.

5. A medium according to claim 4, wherein said protective layer has a thickness of 200 to 5,000 Å.

6. A medium according to claim 1, wherein said substrates have a thickness of 0.2 to 2 mm.

7. A medium according to claim 1, wherein said recording layer has a thickness of 200 to 600 Å.

8. A medium according to claim 1, wherein said recording layer is made of Te.

9. A medium according to claim 1, wherein said adhesive layer has a thickness of 50 to 300 $\mu$m.